US012607346B2

(12) United States Patent
Suzuki et al.

(10) Patent No.: US 12,607,346 B2
(45) Date of Patent: Apr. 21, 2026

(54) GAS AMOUNT PREDICTION METHOD, FACTORY OPERATION METHOD, AND GAS AMOUNT PREDICTION DEVICE

(71) Applicant: JFE STEEL CORPORATION, Tokyo (JP)

(72) Inventors: Katsuya Suzuki, Tokyo (JP); Shuji Kuyama, Tokyo (JP); Aoto Miyazaki, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 929 days.

(21) Appl. No.: 17/797,023

(22) PCT Filed: Feb. 2, 2021

(86) PCT No.: PCT/JP2021/003618

§ 371 (c)(1),
(2) Date: Aug. 2, 2022

(87) PCT Pub. No.: WO2021/157542

PCT Pub. Date: Aug. 12, 2021

(65) Prior Publication Data

US 2023/0060254 A1      Mar. 2, 2023

(30) Foreign Application Priority Data

Feb. 5, 2020      (JP) ................................. 2020-017909

(51) Int. Cl.
*F22B 37/38*          (2006.01)
*G05B 19/418*        (2006.01)

(52) U.S. Cl.
CPC ............ *F22B 37/38* (2013.01); *G05B 19/418* (2013.01)

(58) Field of Classification Search
CPC ....................................................... F22B 37/38
See application file for complete search history.

(56) References Cited

U.S. PATENT DOCUMENTS

| 2013/0074608 A1 | 3/2013 | Tanaka et al. |
| 2014/0047840 A1 | 2/2014 | Snider et al. |
| 2018/0223695 A1 | 8/2018 | Britt et al. |
| 2019/0019136 A1* | 1/2019 | Murakami ........... G06Q 10/083 |

FOREIGN PATENT DOCUMENTS

| CN | 106247308 A | 12/2016 |
| CN | 108446465 A | 8/2018 |
| CN | 209068490 U | 7/2019 |
| CN | 110263501 A | 9/2019 |

(Continued)

OTHER PUBLICATIONS

Apr. 6, 2021 International Search Report issued in International Patent Application No. PCT/JP2021/003618.

(Continued)

*Primary Examiner* — Jason Lau
(74) *Attorney, Agent, or Firm* — Oliff PLC

(57) ABSTRACT

A gas amount prediction method predicts an amount of gas generated in a factory, and includes a generation amount calculation step of calculating a generation amount of actually usable gas by using a learning model that has learned a relationship between a generation amount of the gas and a use amount of the gas in past operation data.

10 Claims, 4 Drawing Sheets

(56)         References Cited

FOREIGN PATENT DOCUMENTS

| JP | 2010-96671 | A | 4/2010 |
| JP | 2013-72602 | A | 4/2013 |
| JP | 6264898 | B2 | 1/2018 |
| JP | 6303473 | B2 | 4/2018 |
| KR | 10-2013-0034586 | A | 4/2013 |
| KR | 10-1704860 | B1 | 2/2017 |

OTHER PUBLICATIONS

Mar. 28, 2025 Office Action issued in Chinese Patent Application No. 202180012544.8.
Jul. 18, 2023 Search Report issued in European Patent Application No. 21751029.6.
May 21, 2024 Office Action issued in Korean Patent Application No. 10-2022-7028390.

* cited by examiner

CORRECTION METHOD:LINEAR REGRESSION
EXPLANATORY VARIABLE:STEAM GENERATION AMOUNT
RESPONSE VARIABLE:STEAM USE AMOUNT
TEACHER DATA QUANTITY:DATA OF LATEST 40h
REGRESSION EQUATION UPDATE:24h
VERIFICATION PERIOD:3 MONTHS

1

GAS AMOUNT PREDICTION METHOD, FACTORY OPERATION METHOD, AND GAS AMOUNT PREDICTION DEVICE

FIELD

The present invention relates to a gas amount prediction method, a factory operation method, and a gas amount prediction device.

BACKGROUND

In an energy management process, for example, steam generated in a factory is used in a wide range of applications such as heating in a production process and heating and humidification of air conditioning. The steam generated in the factory is transported to a power plant or another factory by piping or the like, but is changed into a liquid by heat dissipation. Therefore, an amount of actually usable stream becomes smaller than an amount of steam generated in the factory. Therefore, Patent Literatures 1 and 2 propose methods for grasping the amount of actually usable stream.

Patent Literature 1 discloses a method for measuring a loss of a steam pipe by obtaining a correction coefficient based on an internal pipe temperature of the steam pipe calculated from a steam pressure, and correcting a measured value related to an evaporation amount of the steam with the correction coefficient. In addition, Patent Literature 2 discloses a method for correcting a measurement value of a loss of a steam pipe using a correction coefficient obtained from an in-pipe heat transfer rate corresponding to a liquid film thickness of the steam pipe that varies depending on a flow velocity of the steam.

CITATION LIST

Patent Literature

Patent Literature 1: JP 6303473 B2
Patent Literature 2: JP 6264898 B2

SUMMARY

Technical Problem

However, the method disclosed in Patent Literature 1 has a problem that the method cannot be used in a situation where it is difficult to measure a steam pressure. In addition, the method disclosed in Patent Literature 2 similarly has a problem that the method cannot be used in a situation where it is difficult to measure a flow velocity of steam.

The present invention has been made in view of the above, and it is therefore an object of the present invention to provide a gas amount prediction method, a factory operation method, and a gas amount prediction device capable of easily predicting a steam amount actually usable in an energy management process of a factory.

Solution to Problem

To solve the above-described problem and achieve the object, a gas amount prediction method according to the present invention for predicting an amount of gas generated in a factory includes a generation amount calculation step of calculating a generation amount of actually usable gas by using a learning model that has learned a relationship between a generation amount of the gas and a use amount of the gas in past operation data.

Moreover, in the above-described gas amount prediction method according to the present invention, the generation amount calculation step includes: calculating a use rate of the gas with respect to the generation amount of the gas using the learning model; and calculating the generation amount of the actually usable gas by multiplying the generation amount of the gas acquired at a time of operation by the use rate of the gas.

Moreover, in the above-described gas amount prediction method according to the present invention, the generation amount calculation step performs learning of the learning model using operation data under a climatic condition similar to a current climatic condition in the past operation data.

Moreover, in the above-described gas amount prediction method according to the present invention, the learning model performs learning by regression analysis or autoregressive moving average.

Moreover, the above-described gas amount prediction method according to the present invention, further includes, after the generation amount calculation step, a variation calculation step of calculating and presenting a variation of the generation amount of the gas calculated in the generation amount calculation step, the variation being calculated according to a feature amount related to the gas.

Moreover, in the above-described gas amount prediction method according to the present invention, the feature amount is a sea-level pressure.

Moreover, in the above-described gas amount prediction method according to the present invention, the gas is steam, and the generation amount calculation step calculates a generation amount of the steam actually usable in consideration of a steam loss due to heat dissipation.

To solve the above-described problem and achieve the object, a factory operation method according to the present invention includes changing an operation plan in a factory by changing an operation method of gas in the factory based on a generation amount of actually usable gas, the generation amount of the gas being predicted by the gas amount prediction method.

Moreover, the above-described factory operation method according to the present invention includes changing the operation plan in the factory based on a feature amount related to the gas, a variation according to the feature amount, and the generation amount of the actually usable gas, the generation amount of the gas being predicted by the gas amount prediction method.

To solve the above-described problem and achieve the object, a gas amount prediction device according to the present invention for predicting an amount of gas generated in a factory includes a generation amount calculation unit configured to calculate a generation amount of actually usable gas by using a learning model that has learned a relationship between a generation amount of the gas and a use amount of the gas in past operation data.

Advantageous Effects of Invention

According to the present invention, it is possible to easily predict a gas amount actually usable in a factory using an amount of gas generated and an amount of gas used in past operation data without requiring measurement of a gas pressure, a flow velocity, or the like and complicated calculation.

DESCRIPTION OF EMBODIMENTS

A gas amount prediction method, a factory operation method, and a gas amount prediction device according to an embodiment of the present invention will be described with reference to the drawings.

(Gas Amount Prediction Device)

Figure 1:
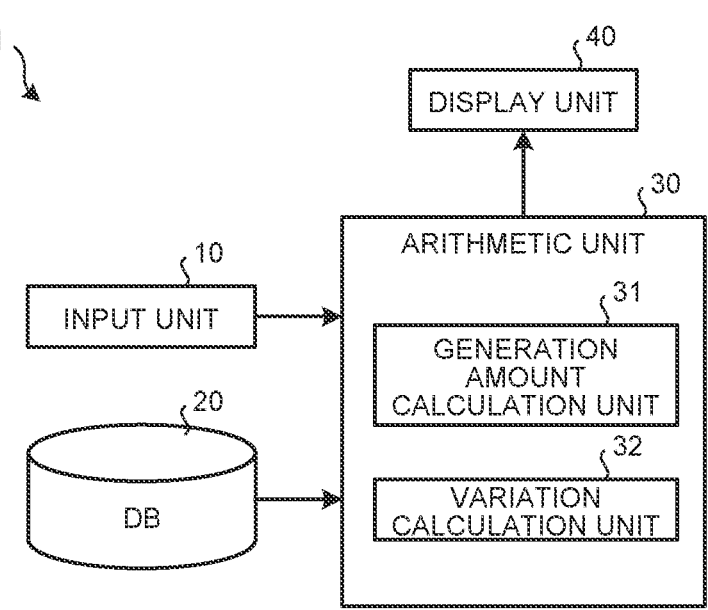
FIG. 1 is a block diagram illustrating a schematic configuration of a gas amount prediction device according to an embodiment of the present invention.

A configuration of a gas amount prediction device 1 according to the embodiment of the present invention will be described with reference to FIG. 1. The gas amount prediction device 1 is a device that predicts an amount of gas generated in a factory, specifically, an amount of gas actually usable in the factory, in an energy management process of the factory. Examples of the gas include steam generated in the factory and evolved gas. In the present embodiment, an example where the gas is steam will be described.

The gas amount prediction device 1 is realized by a general-purpose information processing device such as a personal computer and a workstation, and includes an input unit 10, a database (DB) 20, an arithmetic unit 30, and a display unit 40.

The input unit 10 is an input means to the arithmetic unit 30, and is realized by an input device such as a keyboard, a mouse pointer, and a numeric keypad. The database 20 stores past operation data (performance data).

The arithmetic unit 30 is realized by, for example, a processor including a central processing unit (CPU) and a memory (main storage unit) including a random access memory (RAM) and a read only memory (ROM). The arithmetic unit 30 loads a program into a work area of the main storage unit, executes the program, and controls each component and the like through execution of the program, thereby realizing a function matching a predetermined purpose. The arithmetic unit 30 functions as a generation amount calculation unit 31 and a variation calculation unit 32 through the execution of the program.

The generation amount calculation unit 31 calculates an actually usable steam generation amount (usable steam amount) by using a learning model that has learned a relationship between a generation amount of steam (hereinafter referred to as "steam generation amount") and a use amount of steam (hereinafter referred to as "steam use amount") in the past operation data. Here, the "actually usable steam generation amount" is, for example, a steam generation amount in consideration of a loss (steam loss) due to liquefying of steam by heat dissipation. The "actually usable steam generation amount" indicates a steam amount obtained by subtracting the above-described steam loss from the steam generation amount in the factory.

Specifically, the generation amount calculation unit 31 calculates a use rate of steam (hereinafter, referred to as "steam use rate") with respect to the steam generation amount by using the learning model that has learned the relationship between the steam generation amount and the steam use amount in the past operation data. The steam use rate can be expressed by, for example, "steam use amount/steam generation amount". Furthermore, the learning model may use a method such as regression analysis or autoregressive moving average for learning. A specific method of regression analysis is, for example, the least squares method that is a type of linear regression. However, a machine learning model such as a neural network and a decision tree is also acceptable.

The generation amount calculation unit 31 uses learning data in a climatic condition similar to a current climatic condition as learning data (teacher data) for learning. In other words, the generation amount calculation unit 31 learns the learning model using the steam generation amount and the steam use amount, as the teacher data, included in the operation data under the climatic condition similar to the current climatic condition in the past operation data. The "operation data under the climatic condition similar to the current climatic condition" indicates, for example, latest operation data that is not so far away timewise.

The generation amount calculation unit 31 can use, for example, the steam generation amount and the steam use amount included in the operation data of the "latest one hour to 40 hours before" as the teacher data. In this manner, by performing learning of the learning model using the latest available operation data, prediction accuracy of the steam generation amount is improved. Then, the generation amount calculation unit 31 multiplies the steam generation amount acquired at the time of operation (predicted or measured) by the steam use rate to calculate the actually usable steam generation amount.

The variation calculation unit 32 calculates a variation of the steam generation amount calculated by the generation amount calculation unit 31 according to a feature amount related to the steam. Then, the variation calculation unit 32 presents the variation calculated to an operator through the display unit 40. The "feature amount related to steam" is, for example, a sea-level pressure, temperature, and humidity. Here, the "variation" may be any statistic that evaluates a so-called variation such as a standard deviation ($\sigma$) or $2\sigma$ of a difference between the steam generation amount and the steam use amount calculated using the learning model of the learned steam use rate, dispersion, or root-mean-square error (RMSE). Here, an example using 1σ will be described.

(Gas Amount Prediction Method)

Figure 2:
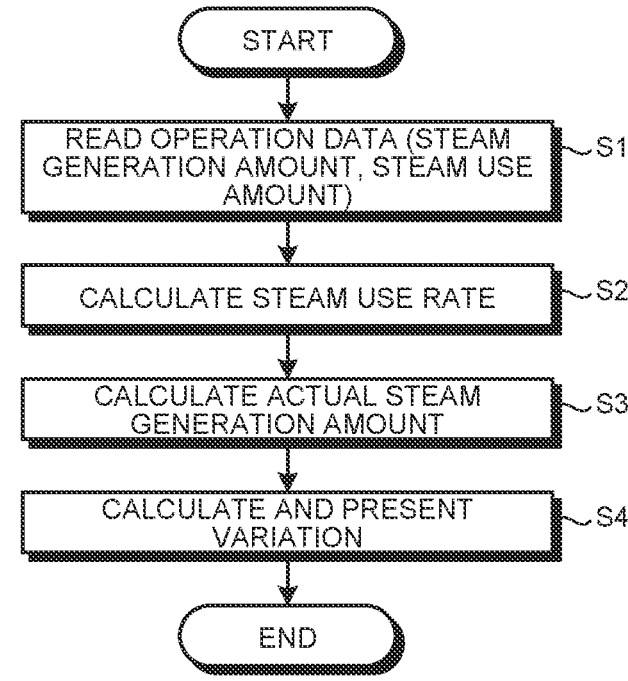
FIG. 2 is a flowchart illustrating a flow of a gas amount prediction method according to the embodiment of the present invention.

The gas amount prediction method according to the present embodiment will be described with reference to FIG. 2. Note that the learning method of the learning model is mainly performed by the generation amount calculation unit 31 and the variation calculation unit 32 of the arithmetic unit 30.

First, the generation amount calculation unit 31 reads the past operation data (steam generation amount and steam use amount) necessary for a process from the database 20 (Step S1). Subsequently, the generation amount calculation unit 31 calculates the steam use rate using a method such as the regression analysis or the autoregressive moving average (Step S2).

Subsequently, the generation amount calculation unit 31 multiplies the steam generation amount acquired at the time of operation by the steam use rate to calculate the actually usable steam generation amount (Step S3). Subsequently, the variation calculation unit 32 calculates a variation of the steam generation amount calculated in Step S3 according to the feature amount related to the steam (e.g., sea-level pressure, air temperature, and humidity). Then, the variation calculation unit 32 presents the variation to the operator through the display unit 40 (Step S4).

According to the gas amount prediction device 1 and the gas amount prediction method according to the present embodiment, it is possible to easily predict a gas amount actually usable in the factory using the amount of gas generated and the amount of gas used in the past operation data without requiring measurement of the gas pressure, the flow velocity, or the like and complicated calculation.

Further, according to the gas amount prediction device 1 and the gas amount prediction method of the present embodiment, in addition to predicting the actually usable steam generation amount, the variation according to the feature amount related to the steam (e.g., sea-level pressure, air temperature, and humidity) is calculated and presented. As a result, the operator can create a more accurate steam operation plan to improve the reliability of energy management.

(Factory Operation Method)

The gas amount prediction method described above can also be applied to the factory operation method. In this case, a factory operation plan is changed by changing a gas operation method in the factory based on the actually usable gas (steam) generation amount predicted by the gas amount prediction method described above.

Further, in the factory operation method, the factory operation plan may be changed, in addition to the actually usable gas generation amount predicted by the gas amount prediction method, based on the feature amount related to the gas (e.g., sea-level pressure, air temperature, and humidity), and the variation according to the feature amount.

EXAMPLES

An example of the gas amount prediction method according to the present embodiment will be described with reference to FIGS. 3 to 8. In the example, Steps S1 to S4 of the gas amount prediction method described above were performed to verify effects.

First, the steam use rate was calculated by performing the linear regression analysis (least squares method) every 24 hours, using the operation data from the latest one hour to 40 hours before. In the linear regression analysis, the steam generation amount was used as an explanatory variable and the steam use amount as a response variable.

Figure 3:
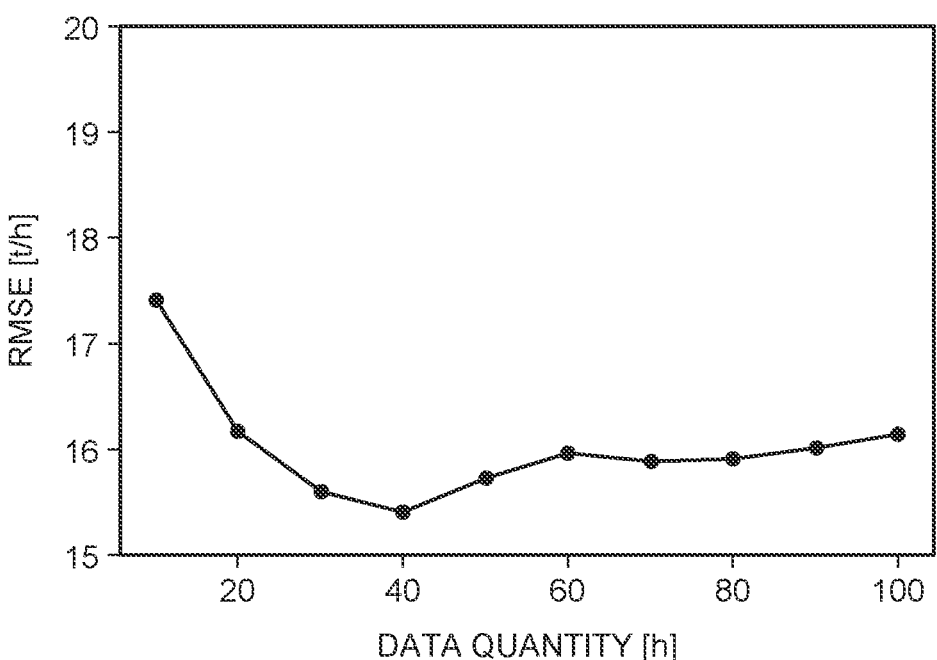
FIG. 3 is a graph illustrating a relationship between an operation data (teacher data) quantity used for prediction and a prediction error (RMSE) in the gas amount prediction method according to the embodiment of the present invention.

Here, FIG. 3 is a graph illustrating a relationship between an operation data (teacher data) quantity used for prediction and a prediction error (root-mean-square error: RMSE). As illustrated in FIG. 3, a prediction accuracy of the steam generation amount depends on the operation data quantity, and the prediction accuracy varies depending on the use of operation data tracing back to which time point. Therefore, as illustrated in FIG. 3, the operation data used for prediction is evaluated in advance to determine the operation data quantity to be used for prediction. In the example, the operation data of the "latest one hour to 40 hours before" that gave the highest accuracy was used. Note that a verification period of the operation data is three months.

Subsequently, the actually usable steam generation amount was calculated by multiplying the steam generation amount acquired at the time of operation by the steam use rate. The actually usable steam generation amount is actually obtained by multiplying a predicted value of the steam generation amount calculated in advance by the steam use rate. However, in the example, an actual value of the steam generation amount was used on the assumption of an ideal situation that the prediction of the steam generation amount is 100% correct.

Figure 4:
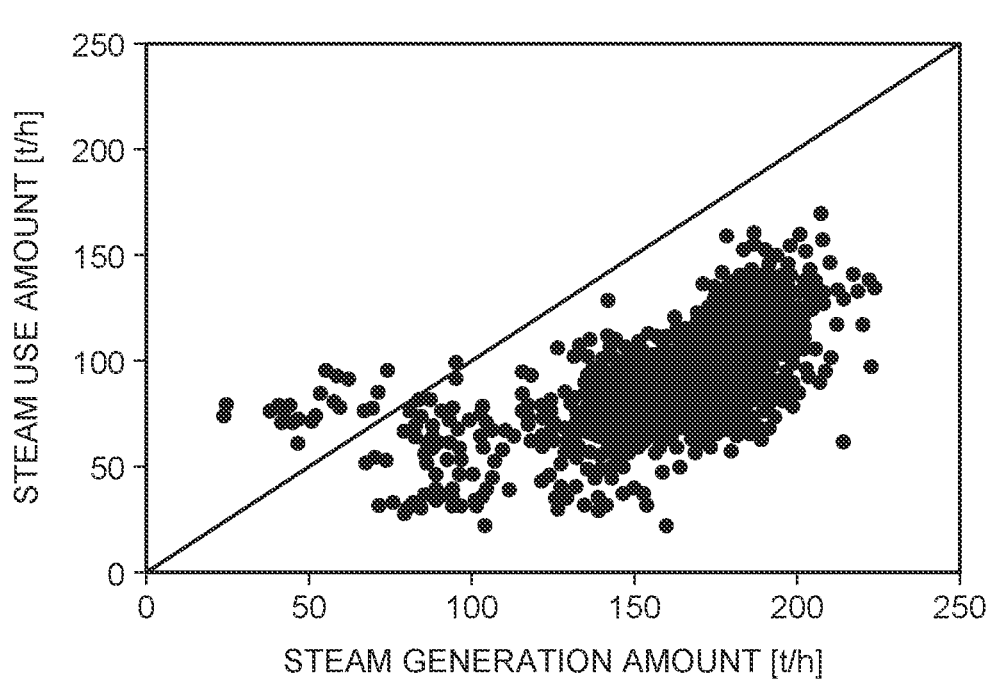
FIG. 4 is a scatter diagram illustrating a relationship between a steam use amount and a steam generation amount before correction in an example of the gas amount prediction method according to the embodiment of the present invention.

Here, FIG. 4 is a scatter diagram illustrating a relationship between the steam use amount and the steam generation amount before correction using the steam use rate. As illustrated in FIG. 4, before the correction of the steam generation amount using the steam use rate, a distribution is such that the steam use amount is lower with respect to the steam generation amount.

Figures 5, 6:
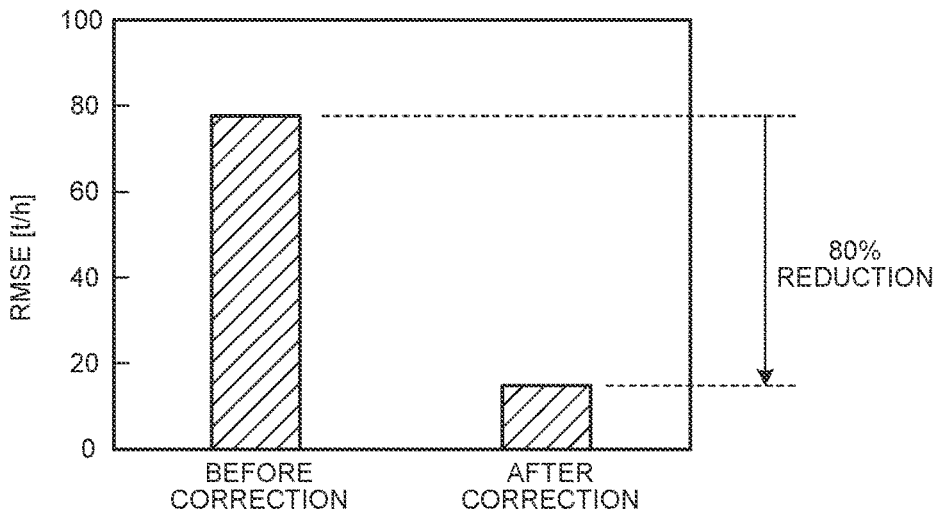
FIG. 5 is a scatter diagram illustrating a relationship between the steam use amount and a steam generation amount after correction in the example of the gas amount prediction method according to the embodiment of the present invention.
FIG. 6 is a bar graph comparing errors in the steam generation amount before and after correction in the example of the gas amount prediction method according to the embodiment of the present invention.

On the other hand, FIG. 5 is a scatter diagram illustrating the relationship between the steam use amount and a steam generation amount after the correction using the steam use rate (usable steam amount). As illustrated in FIG. 5, it can be seen that the steam generation amount correlates with the steam use amount after the steam generation amount is corrected using the steam use rate.

FIG. 6 is a bar graph illustrating comparison, using RMSE, between errors of the steam generation amount before and after correction by the steam use rate. As illustrated in FIG. 6, it can be seen that the accuracy has improved by 80% by correcting the steam generation amount using the steam use rate. As described above, according to the present invention, since the steam generation amount (usable steam amount) on a next day can be acquired, for example, at 15:00 on a previous day, the operator can create a more accurate steam operation plan.

Figure 7:
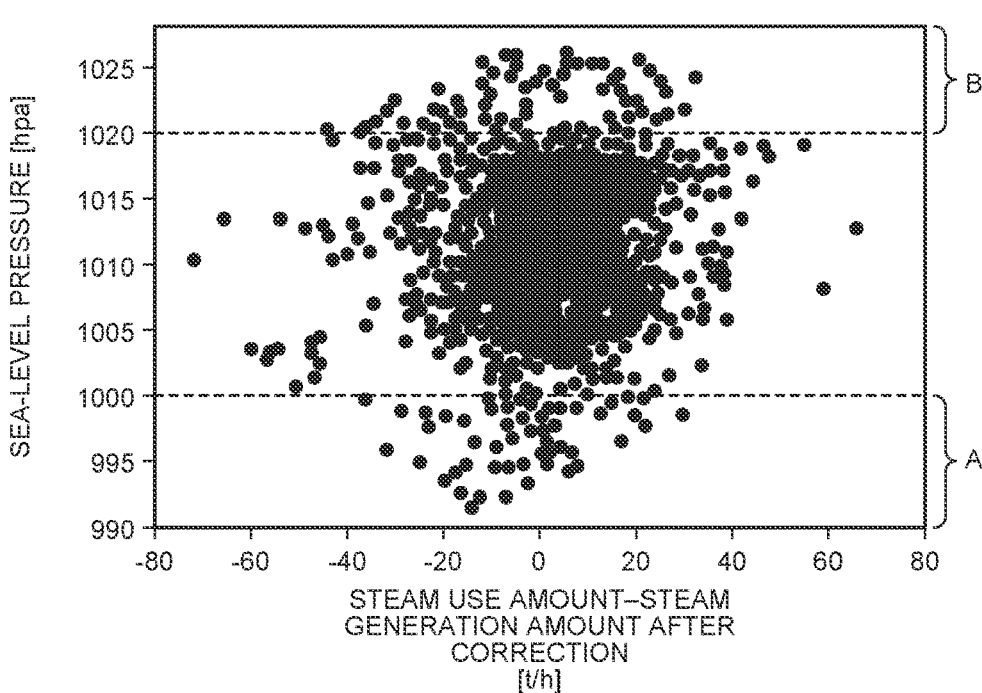
FIG. 7 is a scatter diagram illustrating a relationship between a sea-level pressure and a correction error of the steam generation amount in the example of the gas amount prediction method according to the embodiment of the present invention.

FIG. 7 is a scatter diagram illustrating a relationship between the sea-level pressure and a correction error of the steam generation amount. Note that the "correction error of the steam generation amount" indicates a value obtained by subtracting the corrected steam generation amount from the steam use amount as indicated by the horizontal axis in FIG. 7. As illustrated in FIG. 7, it can be seen that variation in the correction error is small when the sea-level pressure is low, and the variation in the correction error increases as the sea-level pressure increases.

Figure 8:
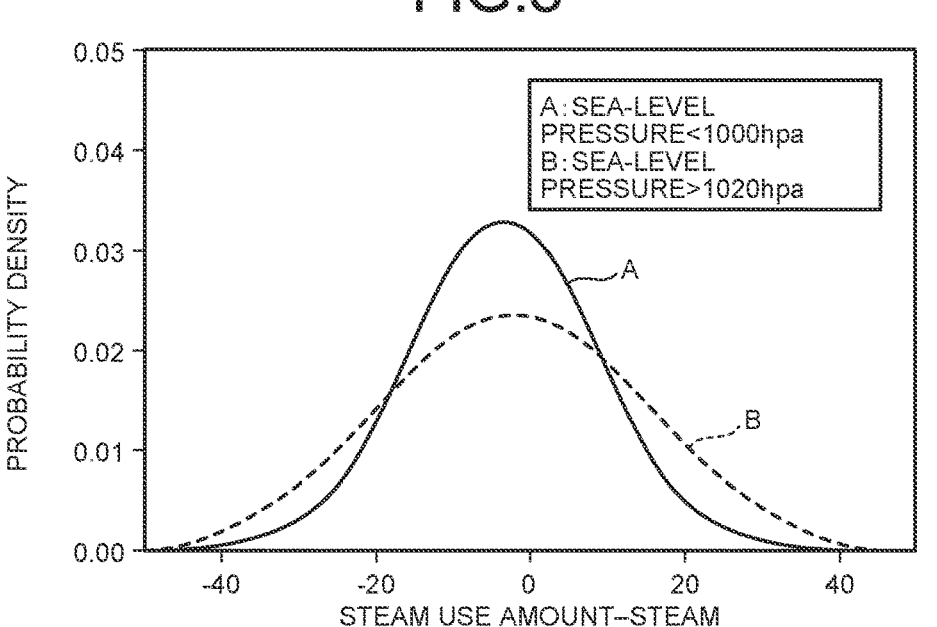
FIG. 8 is a diagram illustrating, by probability distribution, the correction error of the steam generation amount according to a magnitude of the sea-level pressure in the example of the gas amount prediction method according to the embodiment of the present invention.

FIG. 8 is a diagram illustrating, in a probability distribution, the correction error of the steam generation amount according to a magnitude of the sea-level pressure. As illustrated in FIG. 8, in the case of A where the sea-level pressure is low (sea-level pressure <1000 hpa), the variation in the correction error is small and thus the probability distribution is steep. On the other hand, in the case of B where the sea-level pressure is high (sea-level pressure

7

>1020 hpa), the variation in the correction error of the steam generation amount is large and thus the probability distribution is gentle.

In the gas amount prediction method according to the present embodiment, for example, the variations illustrated in FIGS. 4, 5, 7, and 8 described above are summarized in one screen and displayed on the display unit 40, so that guidance informing reliability of the corrected steam generation amount (usable steam amount) can be provided to the operator. Then, the operator who has received such guidance adjusts (delays or accelerates) a start time of a Ruhrstahl Heraeus (RH) process that uses a large amount of steam in secondary refining of steelmaking because the variation in the correction error of the steam generation amount increases, for example, when the sea-level pressure is high. Accordingly, the steam operation can be stabilized. In the RH process, molten steel is degasified by refluxing the molten steel with Ar gas, and oxygen is blown to the molten steel to decarburize the molten steel. In order to accelerate the reaction, steam is discharged outside an apparatus to decompress a vacuum chamber.

In this manner, the variation in the correction error of the steam generation amount is evaluated according to a specific feature amount such as the sea-level pressure, and the operating condition (e.g. operation start time, operation end time, and steam use amount) of a specific process in which the steam is largely used is changed according to a value of the feature amount. As a result, the steam use amount in the entire factory does not exceed the generation amount, and the steam can be used efficiently and stably.

Although the gas amount prediction method, the factory operation method, and the gas amount prediction device according to the present invention have been specifically described with reference to the embodiment and the example for carrying out the invention, the gist of the present invention is not limited to these descriptions, and should be widely interpreted based on the description of the claims. It is obvious that various changes and modifications based on the descriptions are also included in the gist of the present invention.

For example, in the gas amount prediction method, the factory operation method, and the gas amount prediction device according to the present embodiment, the description has been made on the assumption that the gas is steam, but the present invention is also applicable to a case where the gas is evolved gas.

REFERENCE SIGNS LIST

1 GAS AMOUNT PREDICTION DEVICE
10 INPUT UNIT
20 DATABASE (DB)
30 ARITHMETIC UNIT
31 GENERATION AMOUNT CALCULATION UNIT
32 VARIATION CALCULATION UNIT
40 DISPLAY UNIT

The invention claimed is:

1. A gas amount prediction method for predicting an amount of gas generated in a factory, the method comprising a generation amount calculation step of calculating a generation amount of actually usable gas by using a learning model that has learned a relationship between a generation amount of the gas and a use amount of the gas in past operation data, wherein

8 the generation amount calculation step includes:
calculating a use rate of the gas with respect to the generation amount of the gas using the learning model; and
calculating the generation amount of the actually usable gas by multiplying the generation amount of the gas acquired at a time of operation by the use rate of the gas.

2. The gas amount prediction method according to claim 1, wherein the generation amount calculation step performs learning of the learning model using operation data under a climatic condition similar to a current climatic condition in the past operation data.

3. The gas amount prediction method according to claim 1, wherein the learning model performs learning by regression analysis or autoregressive moving average.

4. The gas amount prediction method according to claim 1, further comprising, after the generation amount calculation step, a variation calculation step of calculating and presenting a variation of the generation amount of the gas calculated in the generation amount calculation step, the variation being calculated according to a feature amount related to the gas.

5. The gas amount prediction method according to claim 4, wherein the feature amount is a sea-level pressure.

6. The gas amount prediction method according to claim 1, wherein
the gas is steam, and
the generation amount calculation step calculates a generation amount of the steam actually usable in consideration of a steam loss due to heat dissipation.

7. A factory operation method comprising changing an operation plan in a factory by changing an operation method of gas in the factory based on a generation amount of actually usable gas, the generation amount of the gas being predicted by the gas amount prediction method according to claim 1.

8. The factory operation method according to claim 7, comprising changing the operation plan in the factory based on a feature amount related to the gas, a variation according to the feature amount, and the generation amount of the actually usable gas, the generation amount of the gas being predicted by the gas amount prediction method according to claim 1.

9. A gas amount prediction device for predicting an amount of gas generated in a factory, the gas amount prediction device comprising
a generation amount calculation unit configured to calculate a generation amount of actually usable gas by using a learning model that has learned a relationship between a generation amount of the gas and a use amount of the gas in past operation data, wherein
the generation amount calculation unit is further configured to:
calculate a use rate of the gas with respect to the generation amount of the gas using the learning model; and
calculate the generation amount of the actually usable gas by multiplying the generation amount of the gas acquired at a time of operation by the use rate of the gas.

10. A factory operation method comprising changing an operation plan in a factory by changing an operation method of gas in the factory based on a generation amount of actually usable gas, the generation amount of the gas being predicted by the gas amount prediction method according to claim 6.

* * * * *